United States Patent
Bildtsen

[11] Patent Number: 5,906,164
[45] Date of Patent: May 25, 1999

[54] COACH COUPLING ASSEMBLY

[75] Inventor: Christian Bildtsen, Lerum, Sweden

[73] Assignee: Aktiebolaget SKF, Goteborg, Sweden

[21] Appl. No.: 08/740,323

[22] Filed: Oct. 28, 1996

[30] Foreign Application Priority Data

Oct. 30, 1995 [SE] Sweden ................................. 9503808

[51] Int. Cl.⁶ ................................................. B61D 17/00
[52] U.S. Cl. ............................. 105/3; 105/4.1; 280/400; 280/488; 384/556; 384/558; 384/582
[58] Field of Search ..................... 105/34.1, 8.1; 213/75 R; 280/400, 403, 483, 488, 492; 384/489, 495, 536, 556, 558, 581, 582

[56] References Cited

U.S. PATENT DOCUMENTS

| 2,070,081 | 2/1937 | Henry ....................................... 384/582 |
| 2,141,122 | 12/1938 | Boden ...................................... 384/582 |
| 2,565,759 | 8/1951 | Danly et al. ............................. 384/556 |
| 3,687,084 | 8/1972 | O'Leary et al. . |
| 5,044,785 | 9/1991 | Bair et al. ................................ 384/582 |
| 5,456,185 | 10/1995 | Rother et al. ............................ 105/4.1 |
| 5,586,506 | 12/1996 | Heubusch et al. .......................... 105/3 |
| 5,615,786 | 4/1997 | Hoyon et al. ............................. 105/4.1 |

FOREIGN PATENT DOCUMENTS

| 0 612 646 | 8/1994 | European Pat. Off. . |
| 2 695 612 | 3/1994 | France . |
| 6666805 | 2/1952 | United Kingdom ................... 384/582 |
| 94/20766 | 9/1994 | WIPO . |

*Primary Examiner*—S. Joseph Morano
*Attorney, Agent, or Firm*—Burns, Doane, Swecker & Mathis, L.L.P.

[57] ABSTRACT

Coach coupling assembly for coupling together two coaches of a railbound multi-unit set of coaches has a first coupling arm fixed to one of the coaches and a second coupling arm fixed to a second one of the coaches. The first coupling arm has a vertical through-bore that houses the outer race ring of a rolling bearing. The bore in the inner race ring of the bearing receives a depending shaft journal that is fixed to the second coupling arm. An arrangement is provided to damp radial forces acting upon the coupling and to compensate for misalignment between the axes of the through-bore and the shaft journal. In this regard, the through-bore is provided with an elastic lining of resilient material, and the bearing used is an angularly self-aligning rolling bearing that permits a certain degree of misalignment between the through-bore and the shaft journal. The bearing is fitted inside the lining, which is thereby adapted to take up and dampen radial forces acting upon the coupling.

22 Claims, 1 Drawing Sheet

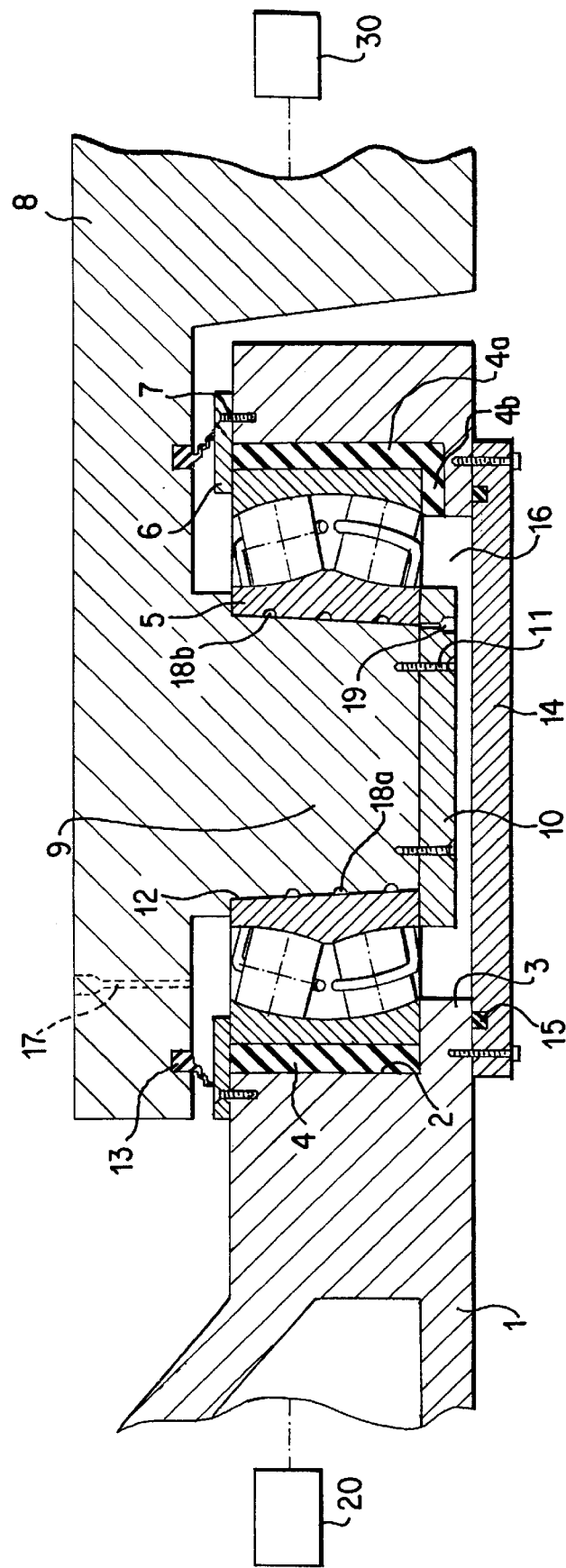

COACH COUPLING ASSEMBLY

FIELD OF THE INVENTION

The present invention relates to a coupling assembly and more particularly to a coach coupling assembly for coupling together two coaches of a railbound multi-unit set of coaches.

BACKGROUND OF THE INVENTION

Coaches of rolling stock, such as tram trains, are of two main types. One type is equipped with double wheel units, one at each end of the coach. The other type, referred to as a trailing coach, has only one wheel unit located at that end of the coach which is not to be connected to another coach.

At the end or ends to be coupled together with a trailing coach, the coach has a fixed coupling device formed as a projecting beam with a vertically arranged socket intended to receive from above a depending shaft journal arranged at the outer end of an arm projecting in the longitudinal direction from the trailing coach end having no wheel unit. The depending shaft journal must be journalled in the socket to be able to make angular pivoting movements in the socket when the tram train or the like travels along curves, for example. With a rigidly supported shaft journal, impacts and vibrations occurring during travel, e.g. during braking, could cause damage to the rolling bodies and the race tracks of the rolling bearing used for journalling the shaft journal. To avoid such damages, it is essential to eliminate the transfer of such impacts, vibrations etc. This can preferably be accomplished by providing the coupling with elastic damping means arranged to absorb such impacts.

Furthermore, it is also important to provide the coupling with the possibility of certain relative movement about an imagined horizontal axis to allow travel over level differences without subjecting the bearing or the coupling means to stresses. Such adjustability can also, to a certain extent, be obtained with elastic damping means.

EP-A1-0 612 646 refers to a coach coupling as described above, wherein the depending shaft journal is supported in a deep groove ball bearing. The impact damping means in this case is designed as an elastomeric linkage having a stiff inner body with a vertical center bore for receiving the depending shaft journal, and a stiff outer body having a seat surface for the inner race ring of the ball bearing. The two stiff linkage bodies are spaced apart by a hemispherical elastomeric shell-formed body, and the two stiff linkage bodies have surfaces facing the shell-formed elastomeric body shaped to match the curvature of the "hemi-spherical" body. However, manufacturing such a linkage body is expensive and the design is partially open. Thus, the coupling must be protected from dirt and moisture by way of an external sealing bellows.

SUMMARY OF THE INVENTION

The present invention is designed to provide a coach coupling which is designed in such a manner that it is compact in size and sealed off, while at the same time being constructed from inexpensive standard machine elements.

In accordance with the present invention, a coach coupling assembly for coupling together two coaches of a railbound multi-unit set of coaches includes a first coupling arm fixedly connected to a first one of the coaches, a second coupling arm fixedly connected to a second one of the coaches, and a roller bearing having an inner race ring provided with a bore and an outer race ring. The first coupling arm has a substantially vertically arranged through-bore that houses the outer race ring of the rolling bearing and the second coupling arm has a depending shaft journal fixedly fitted thereto. The depending shaft journal is received in the opening in the roller bearing and the through-bore of the first coupling arm is provided with an elastic lining of resilient material. The roller bearing is preferably an angularly self-aligning rolling bearing which permits a limited degree of misalignment between the axes of the through-bore and the shaft journal. The roller bearing is fitted inside the lining, whereby misalignment between the axis of the through-bore of the first coupling arm and the axis of the shaft journal are compensated for and radial forces acting upon the coupling assembly are taken up and damped.

BRIEF DESCRIPTION OF THE DRAWING FIGURE

The coach coupling assembly according to the present invention will be further described in detail with reference to the accompanying drawing FIGURE which shows the coach coupling assembly in cross-section, including parts of the coupling arms and the articulated coupling itself.

DETAILED DESCRIPTION OF THE INVENTION

The coach coupling assembly includes a projecting first arm 1, which is fixedly connected to a first coach 20 that is schematically illustrated in the drawing FIGURE. Near the free end of the first arm 1 there is provided a circular, vertical through hole or bore 2, with a concentric bottom flange 3 of smaller diameter than the upper part of the hole 2. A sleeve-formed elastic lining 4 is provided in the bore 2. As illustrated in the left hand half of the drawing FIGURE, the lining 4 is shown as a tubular bushing provided between the circumferential inner surface of the thorough-bore 2 and the outer circumference of the bearing. However, as depicted in the right hand half of the drawing FIGURE, the lining 4a, can have an inwardly directed bottom collar 4b which in the mounted position is situated between the flange 3 and the side face of the bearing.

A double-row spherical roller bearing 5 is mounted so that the circumference of its outer race ring fits into the elastic lining 4. Thus, the outer race ring of the bearing 5 in the mounted position rests on the flange 3 of the first arm 1. As also seen in the drawing FIGURE, the outer race ring of the bearing 5 is further secured from being removed from its mounted position in the elastic lining 4 in the upward direction by way of a ring 6 that is positioned concentric with the hole 2 in the first arm 1. The ring 6 is removably fitted in place by screw joints 7 or the like. The ring 6 has a center opening somewhat smaller than the outer diameter of the bearing 5 so that the inner edge of the ring 6 in the mounted position prevents the bearing 5 from leaving its mounted position within the lining 4. The double-row spherical bearing 5 has a taper bore with its smaller diameter positioned at the bottom side of the bore 2 in the first arm 1.

A second projecting arm 8, which is fixedly connected to another coach 30 (schematically shown in the drawing FIGURE), preferably a trailing coach, has near its outer end a depending and tapering shaft journal 9 having a vertical axis. This tapering shaft journal 9 is dimensioned to be complementary to the dimension of the inner taper of the bearing 5. When mounted in the taper bore of the bearing 5 as shown in the drawing FIGURE, this tapering shaft journal 9 can be driven up to a zero clearance or to a certain pre-tension. After the bearing inner race ring has been driven up to a desired internal clearance, it is affixed to the shaft journal 9 by means of a circular locking disc 10, which is fitted to the end of the shaft journal 9 through the bottom opening of the hole 2. The circular locking disc 10 can be fitted to the end of the shaft journal 9 through the use of, for example, bolts 11. The disc 10 extends radially outside the shaft journal end.

The tapering shaft journal 9 is further provided with a circumferential shoulder 12 at its larger end. The shoulder 12 provides an abutment for the bearing inner race ring to prevent the bearing inner race from moving in one direction. The locking disc 10 on the other hand prevents the inner race ring from moving in the opposite direction. The size of the internal clearance can be made adjustable through the use of shims or the like.

The second arm 8 is further provided with an annular sealing device 13 positioned concentric to the center axis of the tapering shaft journal 9. This sealing device 13 forms a sliding seal against the facing surface of the first arm 1 or, as shown in the drawing FIGURE, against the bearing securing ring 6 attached to the first arm 1.

The bottom opening of the bore 2 is finally covered by a cover disc 14. The cover disc 14 can be removably affixed to the first arm 1 by, for example, screw joints. Disposed between the cover disc 14 and the facing surface of the first arm 1 is an annular sealing device, such as an O-ring seal 15. The O-ring seal 15 can be positioned in a groove in the cover disc 14 or in the bottom surface of the first arm 1.

The provision of the seal 13 and the cover disc 14 with its seal 15 provides a sealed-off chamber 16 in which the bearing and the cooperating surfaces of the coach coupling are all enclosed. This sealingly closed chamber 16 advantageously protects the bearing and the coupling details from external dirt and moisture. This closed chamber can preferably be completely filled with a liquid or semi-liquid lubricant via a lubricant nipple 17.

As illustrated in the left hand side of the drawing FIGURE, the envelope surface of the shaft journal 9 can be equipped with a helical groove 18a. Alternatively or in addition, as shown in the right hand side of the drawing FIGURE, the bore of the inner race ring of the bearing 5 can be equipped with a helical groove 18b. These grooves 18a, 18b can be connected to a source of pressurized oil via a duct 19 for facilitating dismantling of the coupling for repair and maintenance purposes.

In accordance with the present invention, a reliable, simple and cost efficient coach coupling of the type mentioned initially is provided which is construed mainly from standard machine components. The sleeve-formed elastic lining 4 advantageously takes up and absorbs radial forces, whereas the spherical roller bearing 5 provides smooth operation at angular movements when the center axes of the bore 2 in the first arm 1 and the shaft journal 9 on the second arm coincide, but also, due to the self-aligning properties of the spherical roller bearing, when misalignments occur between these two axes.

The invention is not limited to the particular embodiments shown in the drawing FIGURE and described above. Rather, modifications and variations are possible within the scope of the appended claims. Thus, although the bearing has been shown and described as a double-row spherical roller bearing, it could, without departing from the scope of the invention, be substituted by any other rolling bearing having self-aligning properties similar or nearly similar to a spherical roller bearing. The shaft journal of the second arm and the bore of the inner race ring of the bearing have been shown to have complementary tapering shapes, but it is also possible to use a cylindrical shaft journal which is mounted in a cylindric bore, even if the tapering embodiment will facilitate application of a desired internal clearance in the bearing and the introduction of the smaller shaft journal end into the bore in the inner bearing race ring.

What is claimed is:

1. A coach coupling assembly for coupling together two coaches of a railbound multi-unit set of coaches, comprising a first coupling arm fixedly connectable to a first one of the coaches, a second coupling arm fixedly connectable to a second one of the coaches, a roller bearing having an inner race ring provided with a bore and an outer race ring, the first coupling arm having a substantially vertically arranged through-bore that houses the outer race ring of the roller bearing, the through-bore in the first coupling arm having a substantially vertically oriented axis, the second coupling arm having a depending shaft journal fixedly fitted to the second coupling arm, the depending shaft journal having a substantially vertically oriented axis and being received in the opening in the roller bearing, the through-bore of the first coupling arm being provided with an elastic lining of a resilient material, the lining being a sleeve of elastically resilient material, one end of the sleeve that is positioned in the through-bore of the first coupling arm being provided with a radially inwardly extending collar, and the roller bearing being an angularly self-aligning roller bearing which permits a limited degree of misalignment between the substantially vertically oriented axes of the through-bore and the shaft journal, the roller bearing being fitted inside said lining whereby misalignment between the substantially vertically oriented axis of the through-bore of the first coupling arm and the substantially vertically oriented axis of the shaft journal are compensated for and radial forces acting upon the coupling assembly are taken up and damped.

2. A coach coupling assembly as claimed in claim 1, wherein the lining is a tubular sleeve of elastically resilient material.

3. A coach coupling assembly as claimed in claim 2, the shaft journal of the second coupling arm and the bore in the inner race ring of the bearing have complementary tapering shapes.

4. A coach coupling assembly as claimed in claim 1, wherein the roller bearing is a double-row spherical roller bearing.

5. A coach coupling assembly as claimed in claim 4, wherein the bearing, the lining and the depending shaft journal are enclosed in a sealed-off chamber.

6. A coach coupling assembly as claimed in claim 5, wherein the sealed-off chamber is provided with a lubricant nipple for introducing a lubricant into the sealed-off chamber.

7. A coach coupling assembly as claimed in claim 1, wherein the roller bearing is a double-row spherical roller bearing.

8. A coach coupling assembly as claimed in claim 7, wherein the bearing, the lining and the depending shaft journal are enclosed in a sealed-off chamber.

9. A coach coupling assembly as claimed in claim 8, wherein the sealed-off chamber is provided with a lubricant nipple for introducing a lubricant into the sealed-off chamber.

10. A coach coupling assembly as claimed in claim 1, wherein the bearing, the lining and the depending shaft journal are enclosed in a sealed-off chamber.

11. A coach coupling assembly as claimed in claim 10, wherein the sealed-off chamber is provided with a lubricant nipple for introducing a lubricant into the sealed-off chamber.

12. A coach coupling assembly as claimed in claim 1, the shaft journal of the second coupling arm and the bore in the inner race ring of the bearing have complementary tapering shapes.

13. A coach coupling assembly as claimed in claim 12, wherein the inner race ring and the outer race ring of the bearing are secured to the first and second coupling arms respectively by fixed abutment surfaces and removably fixed locking elements.

14. A coach coupling assembly as claimed in claim 1, wherein the inner race ring and the outer race ring of the bearing are secured to the first and second coupling arms respectively by fixed abutment surfaces and removably fixed locking elements.

15. A coach coupling assembly as claimed in claim 1, wherein the through-bore in the first coupling arm has a bottom side that is sealingly covered by a removable cover member that is separate from the first coupling arm.

16. A coach coupling assembly as claimed in claim 1, wherein said lining is positioned immediately adjacent the outer race ring of the roller bearing.

17. A coach coupling assembly for coupling together two coaches of a railbound multi-unit set of coaches, comprising a first coupling arm fixedly connectable to a first one of the coaches, a second coupling arm fixedly connectable to a second one of the coaches, a roller bearing having an inner race ring provided with a bore and an outer race ring, the first coupling arm having a substantially vertically arranged through-bore that houses the outer race ring of the roller bearing, the through-bore in the first coupling arm having an axis, the second coupling arm having a depending shaft journal fixedly fitted to the second coupling arm, the depending shaft journal having an axis and being received in the opening in the roller bearing, the through-bore of the first coupling arm being provided with an elastic lining of a resilient material, and the roller bearing being an angularly self-aligning roller bearing which permits a limited degree of misalignment between the axes of the through-bore and the shaft journal, the roller bearing being fitted inside said lining whereby misalignment between the axis of the through-bore of the first coupling arm and the axis of the shaft journal are compensated for and radial forces acting upon the coupling assembly are taken up and damped, the shaft journal having an outer envelope surface, and at least one of the bore of the inner race ring of the bearing and the outer envelope surface of the shaft journal being provided with a helical groove that is in communication with a duct for being connected to a source of pressurized fluid.

18. A coach coupling assembly for coupling together two coaches of a railbound multi-unit set of coaches, comprising a first coupling arm fixedly connectable to a first one of the coaches, a second coupling arm fixedly connectable to a second one of the coaches, a spherical roller bearing having an inner race ring provided with a bore and an outer race ring, the first coupling arm having a substantially vertically arranged through-bore that houses the outer race ring of the spherical roller bearing, the through-bore in the first coupling arm having a substantially vertically oriented axis, the second coupling arm having a depending shaft journal fixedly fitted to the second coupling arm, the depending shaft journal having a substantially vertically oriented axis and being received in the opening in the spherical roller bearing, the through-bore of the first coupling arm being provided with an elastic lining of a resilient material, the lining being a sleeve of elastically resilient material, one end of the sleeve that is positioned in the through-bore of the first coupling arm being provided with a radially inwardly extending collar, and the spherical roller bearing being an angularly self-aligning roller bearing which permits a limited degree of misalignment between the substantially vertically oriented axes of the through-bore and the shaft journal, the spherical roller bearing being fitted inside said lining whereby misalignment between the substantially vertically oriented axis of the through-bore of the first coupling arm and the substantially vertically oriented axis of the shaft journal are compensated for and radial forces acting upon the coupling assembly are taken up and damped, and an annular sealing device positioned between the first coupling arm and the second coupling arm for forming a sealed-off chamber enclosing the lining and the depending shaft journal.

19. A coach coupling assembly as claimed in claim 18, wherein said lining is positioned immediately adjacent the outer race ring of the roller bearing.

20. A coach coupling assembly for coupling together two coaches of a railbound multi-unit set of coaches, comprising a first coupling arm fixedly connectable to a first one of the coaches, a second coupling arm fixedly connectable to a second one of the coaches, a spherical roller bearing having an inner race ring provided with a bore and an outer race ring, the first coupling arm having a substantially vertically arranged through-bore that houses the outer race ring of the spherical roller bearing, the through-bore in the first coupling arm having an axis, the second coupling arm having a depending shaft journal fixedly fitted to the second coupling arm, the depending shaft journal having an axis and being received in the opening in the spherical roller bearing, the through-bore of the first coupling arm being provided with an elastic lining of a resilient material, and the spherical roller bearing being an angularly self-aligning roller bearing which permits a limited degree of misalignment between the axes of the through-bore and the shaft journal, the spherical roller bearing being fitted inside said lining whereby misalignment between the axis of the through-bore of the first coupling arm and the axis of the shaft journal are compensated for and radial forces acting upon the coupling assembly are taken up and damped, an annular sealing device positioned between the first coupling arm and the second coupling arm for forming a sealed-off chamber enclosing the lining and the depending shaft journal, and a removal preventing ring secured to the first coupling arm and overlying the outer race ring to prevent removal of the outer race ring, said sealing device being positioned between the removal preventing ring and the second coupling arm.

21. A coach coupling assembly for coupling together two coaches of a railbound multi-unit set of coaches, comprising a first coupling arm fixedly connectable to a first one of the coaches, a second coupling arm fixedly connectable to a second one of the coaches, a roller bearing having an inner race ring provided with a bore and an outer race ring, the first coupling arm having a substantially vertically arranged through-bore that houses the outer race ring of the roller bearing, the through-bore in the first coupling arm having an axis, the second coupling arm having a depending shaft journal fixedly fitted to the second coupling arm, the depending shaft journal having an axis and being received in the opening in the roller bearing, the through-bore of the first coupling arm being provided with an elastic lining of a resilient material, the roller bearing being an angularly self-aligning roller bearing which permits a limited degree of misalignment between the axes of the through-bore and the shaft journal, the roller bearing being fitted inside said lining whereby misalignment between the axis of the through-bore of the first coupling arm and the axis of the shaft journal are compensated for and radial forces acting upon the coupling assembly are taken up and damped, a cover disc secured to the first coupling arm to cover a bottom of the through-bore in the first coupling arm, and an annular seal provided between surfaces of the cover disc and the first coupling arm that face one another.

22. A coach coupling assembly for coupling together two coaches of a railbound multi-unit set of coaches, comprising a first coupling arm fixedly connectable to a first one of the coaches, a second coupling arm fixedly connectable to a second one of the coaches, a spherical roller bearing having an inner race ring provided with a bore and an outer race ring, the first coupling arm having a substantially vertically arranged through-bore that houses the outer race ring of the spherical roller bearing, the through-bore in the first coupling arm having an axis, the second coupling arm having a depending shaft journal fixedly fitted to the second coupling arm, the depending shaft journal having an axis and being received in the opening in the spherical roller bearing, the through-bore of the first coupling arm being provided with an elastic lining of a resilient material, and the spherical roller bearing being an angularly self-aligning roller bearing which permits a limited degree of misalignment between the axes of the through-bore and the shaft journal, the spherical roller bearing being fitted inside said lining whereby misalignment between the axis of the through-bore of the first coupling arm and the axis of the shaft journal are compensated for and radial forces acting upon the coupling assembly are taken up and damped, an annular sealing device positioned between the first coupling arm and the second coupling arm for forming a sealed-off chamber enclosing the lining and the depending shaft journal, a cover disc secured to the first coupling arm to cover a bottom of the through-bore in the first coupling arm, and an annular seal provided between surfaces of the cover disc and the first coupling arm that face one another.

* * * * *